(12) United States Patent
Kerber

(10) Patent No.: US 7,745,948 B2
(45) Date of Patent: Jun. 29, 2010

(54) EMERGENCY PITCH DRIVE UNIT FOR A WIND TURBINE

(75) Inventor: Lutz Kerber, Rheine (DE)

(73) Assignee: General Electric Company, Schenectady, NY (US)

( * ) Notice: Subject to any disclaimer, the term of this patent is extended or adjusted under 35 U.S.C. 154(b) by 69 days.

(21) Appl. No.: 11/946,085

(22) Filed: Nov. 28, 2007

(65) Prior Publication Data

US 2009/0134624 A1 May 28, 2009

(51) Int. Cl.
*F03D 7/00* (2006.01)
*H01M 8/00* (2006.01)

(52) U.S. Cl. .......................................... 290/44; 290/55
(58) Field of Classification Search .................... 290/44
See application file for complete search history.

(56) References Cited

U.S. PATENT DOCUMENTS

| | | | | |
|---|---|---|---|---|
| 3,484,617 | A * | 12/1969 | Winsel | 290/44 |
| 3,644,148 | A * | 2/1972 | Gutbier | 429/13 |
| 4,152,656 | A * | 5/1979 | Udvardi-Lakos | 327/7 |
| 5,592,028 | A * | 1/1997 | Pritchard | 290/55 |
| 5,907,192 | A | 5/1999 | Lyons et al. | |
| 6,028,414 | A * | 2/2000 | Chouinard et al. | 320/110 |
| 6,100,600 | A * | 8/2000 | Pflanz | 290/54 |
| 6,512,966 | B2 * | 1/2003 | Lof et al. | 700/291 |
| 6,819,086 | B2 | 11/2004 | Wobben | |
| 6,838,923 | B2 * | 1/2005 | Pearson | 327/309 |
| 6,902,837 | B2 * | 6/2005 | McCluskey et al. | 429/9 |
| 6,921,985 | B2 * | 7/2005 | Janssen et al. | 290/44 |
| 7,011,902 | B2 * | 3/2006 | Pearson | 429/13 |
| 7,075,189 | B2 * | 7/2006 | Heronemus et al. | 290/44 |
| 7,250,231 | B2 * | 7/2007 | Edlund | 429/23 |
| 7,339,355 | B2 * | 3/2008 | Erdman et al. | 322/29 |
| 7,355,294 | B2 * | 4/2008 | Teichmann | 290/44 |
| 7,391,126 | B2 * | 6/2008 | Liu et al. | 290/44 |
| 7,471,010 | B1 * | 12/2008 | Fingersh | 290/55 |
| 2004/0053093 | A1 * | 3/2004 | Colborn et al. | 429/23 |
| 2007/0029802 | A1 * | 2/2007 | Moehlenkamp | 290/44 |
| 2008/0210812 | A1 * | 9/2008 | Gans et al. | 244/58 |
| 2008/0284172 | A1 * | 11/2008 | Nielsen | 290/44 |
| 2009/0066089 | A1 * | 3/2009 | Arinaga et al. | 290/55 |

FOREIGN PATENT DOCUMENTS

| | | | |
|---|---|---|---|
| DE | 202005007450 U1 * | 7/2005 | |
| DE | 202005007450 U1 * | 8/2005 | |
| JP | 05146095 A * | 6/1993 | |
| JP | 2005353327 A * | 12/2005 | |
| JP | 2006019036 A * | 1/2006 | |
| WO | WO 2007132303 A1 * | 11/2007 | |

* cited by examiner

*Primary Examiner*—Joseph Waks
(74) *Attorney, Agent, or Firm*—GE Global Patent Operation; Peter T. DiMauro

(57) ABSTRACT

An emergency pitch drive unit for a wind turbine comprises: an electrical motor arranged for adjusting the pitch angle of a wind turbine rotor blade; an emergency power supply unit for supplying electrical power to the motor; and a controller configured for controlling, in the event of a power failure. The motor to adjust the pitch angle uses the electrical power from the emergency power supply unit. The emergency power supply unit comprises a fuel cell.

15 Claims, 4 Drawing Sheets

EMERGENCY PITCH DRIVE UNIT FOR A WIND TURBINE

BACKGROUND OF THE INVENTION

The present invention relates to a wind turbine having a shutdown system, especially an emergency pitch drive unit. It further relates to an emergency pitch drive unit for a wind turbine, and to a method for shutting down a wind turbine.

Wind turbines need to be shutdown quickly in the event of an emergency, in order to prevent damage to the turbine. An emergency requiring a shutdown may be, for example, lightning, failure of a wind turbine component such as the generator, or failure of the network to absorb the generated power.

The shutdown operation generally includes bringing the pitch angle of the rotor blade to a feathered position, i.e. a position in which the torque exerted on the rotor by the wind is reduced. Further, the rotor may be brought to a stop, and the wind power installation pod may be rotated out of the wind.

The emergency power that is necessary to perform these tasks is usually taken from the power network. However, the emergency may be accompanied by a network failure, whence no network power is available for the shutdown. In this case, the power needs to be supplied from an emergency or backup power system. Conventionally, such an emergency power system is realized by means of accumulators, e.g. lead accumulators.

However lead accumulators have a number of disadvantages: they are relatively heavy and take up a large amount of space. Further, since lead accumulators cannot be charged and discharged an unlimited number of times, the charging and discharging properties of the lead accumulators deteriorate with time. The low trickle life of the lead accumulators is a potential safety risk, as the emergency power system is a critical part of the safety chain. Further, the low trickle life, as well as the high cost of recycling or disposing, further implies a relatively high maintenance cost. This cost increases the costs of the wind power installation and of operation thereof.

U.S. Pat. No. 6,819,086 describes an arrangement for supplying emergency power to a wind power installation. In the event of a power failure, sufficient emergency power may be supplied to reposition the rotor blades of the wind power installation and avoid damage to the overall system. This is done through the use of one or more capacitors.

Further, U.S. Pat. No. 5,907,192 describes the use of stored rotational energy for pitching blades and braking the wind turbine in the event of utility power grid failure.

However, there still is a need for an alternative emergency power supply for a wind turbine, in particular for one that is compact despite having a high energy storage capacity, environmentally friendly, easy to maintain, reliable, and/or has a fast response time.

BRIEF DESCRIPTION OF THE INVENTION

In view of the above, there is provided an emergency pitch drive unit for a wind turbine, a wind power installation, and a method for shutting down a wind turbine.

Further aspects, advantages and features of the present invention are apparent from the dependent claims, the description and the accompanying drawings.

According to a first aspect of the invention, an emergency pitch drive unit for a wind turbine comprises an electrical motor arranged for adjusting the pitch angle of a wind turbine rotor blade; an emergency power supply unit for supplying electrical power to the motor; and a controller configured for controlling, in the event of a power failure, the motor to adjust the pitch angle using the electrical power from the emergency power supply unit, e.g. to a feathered position. The emergency power supply unit comprises a fuel cell. This allows for an economic, long-term reliable and environmentally-friendly energy storage with high energy density.

According to a second aspect of the invention, a wind power installation comprises at least one wind turbine and a shutdown system. Further, the shutdown system comprises an electrical actuator arranged for actuating a component of the wind turbine to a shutdown configuration; a primary power supply for supplying electrical power to the wind power installation; a secondary power supply unit for supplying electrical power to at least the shutdown system, and possibly to further parts of the wind power installation; and a controller configured for controlling, in the event of a failure of the primary power supply, the actuator to actuate the component of the wind turbine to the shutdown configuration using the electrical power from the secondary power supply unit. The secondary power supply unit comprises a fuel cell. The wind turbine component may be a rotor blade, and the shutdown configuration may be a pitch angle configuration of the rotor blade, e.g. in the feathered position.

According to a third aspect of the invention, a method for shutting down a wind turbine comprises detecting an event of a power failure; especially in the event of a power failure, supplying electrical power to an electrical motor from an emergency power supply unit comprising a fuel cell; and adjusting the pitch angle of a wind turbine rotor blade by the electrical motor, e.g. to a feathered position.

By using fuel cells an emergency power supply may be provided that has longer life cycles, is smaller in size and weight, simpler, and/or environmentally more friendly than some presently used system.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures wherein.

DETAILED DESCRIPTION OF THE INVENTION

Reference will now be made in detail to the various embodiments of the invention, one or more examples of which are illustrated in the figures. In the figures, same or similar parts are assigned the same reference numbers. Each example is provided by way of explanation of the invention, and is not meant as a limitation of the invention. For example, features illustrated or described as part of one embodiment, such as a buffer capacitor, a charging system for the capacitor or a charging system for the fuel cell, can be used in other embodiments to yield yet a further embodiment. It is intended that the present invention includes such modifications and variations.

Figure 1:
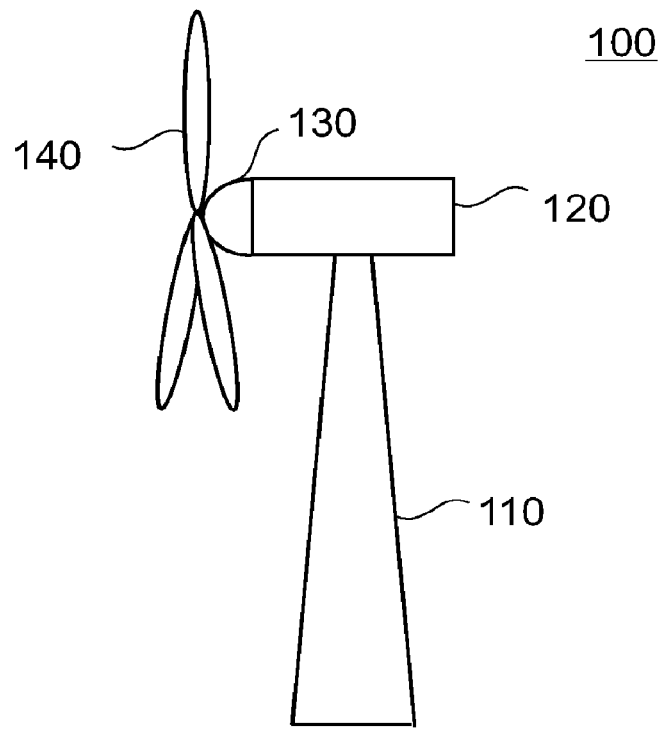
FIG. 1 is a schematic view of a wind turbine according to the present invention.

FIG. 1 is a schematic view of a wind turbine. The wind turbine 100 includes a tower 110 to which a machine nacelle 120 is mounted at its top end. The nacelle houses a drive train to which a main electric generator is connected (not shown). A rotatable hub 130 bearing three rotor blades 140 is mounted to a lateral end of the machine nacelle 120. The rotor blades 140 can be adjusted by pitch drives which are typically accommodated inside hub 130. However, part of the pitch drives, especially the power supply, may also be arranged in other locations, e.g. in other parts of the nacelle 120 than the hub 130, in the foot of the tower 110, or spatially separated from the turbine 100.

Figure 2:
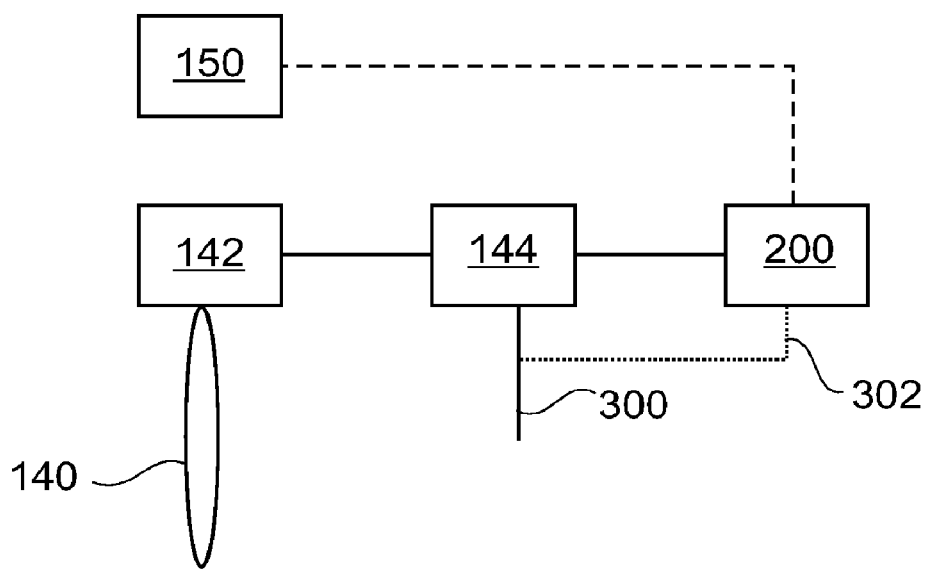
FIG. 2 is a schematic view of an emergency pitch drive unit of the wind turbine of FIG. 1.

With reference to FIG. 2, the pitch drive comprises an electrical motor/actuator 142. Either one motor per rotor blade 140, or one motor for all rotor blades of the turbine may be provided. In any case, the motor 142 is arranged for actuating the pitch angle of the rotor blade 140. In particular, the motor 142 is adapted for bringing the rotor blade to a shutdown configuration, e.g. a feathered position, which is a position in which the torque exerted on the rotor by the wind is reduced.

The motor 142 is typically powered by the power network 300 (primary power supply). However, an emergency power supply unit 200 (secondary power supply) is provided as well, in order to supply electrical power to the motor in the case of a power failure of the primary power supply 300. Further, a controller 144 is operatively connected to the motor 142 and to the power supplies 200, 300. The controller 144 is configured for controlling, during normal operation, the motor 142 to actuate the pitch angle using the electrical power from the power network 300. In the event of a power failure, it is configured for controlling the motor 142 to actuate the pitch angle using the electrical power from the emergency power supply unit 200.

Thus, the motor 142, the controller 144, and the emergency power supply unit 200 are part of an emergency pitch drive unit. If the wind turbine needs to be shut down, the emergency pitch drive adjusts the pitch angle of the rotor blade such as to bring the rotor blade to the shutdown configuration. The shutdown may include activating further parts of a shutdown system, e.g. for bringing the rotor to a stop, or for rotating the wind power installation pod out of the wind. Such parts (not shown) may be powered by the emergency power unit 200 as well.

The emergency power supply unit 200 comprises a fuel cell. This allows for a reliable energy storage of a large amount of energy in a comparably small unit. The fuel cell is described in more detail below.

The emergency power supply unit 200 may be connected to the external power supply 300 (via wire 302 represented as a dotted line) or to some other power supply e.g. for supplying energy in order to keep the fuel cell at and/or to bring the fuel cell to working temperature.

Further, the emergency power supply unit 200 may also be connected to an azimuthal drive 150 of the rotor. This would allow the rotor to be driven away from a potentially dangerous azimuthal position under particularly severe wind conditions using the emergency power supply 200. The azimuthal drive 150 may be controlled using signals from a wind sensor (not shown), and the wind sensor may be powered using the fuel cell as well.

Figure 4:
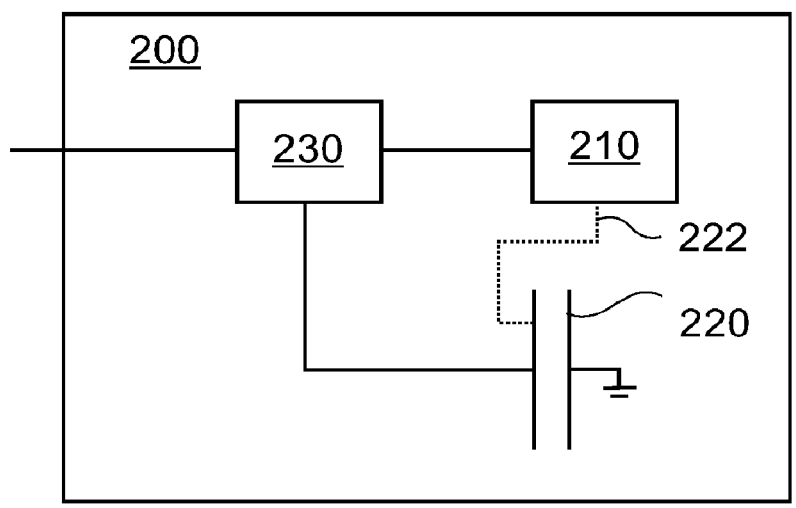
FIG. 4 is a schematic view of an emergency power supply of an emergency pitch drive unit.

The emergency pitch drive unit is configured to operate as follows in the case of a shutdown: The controller 144 tests for an event of a power failure; if a power failure is detected, it supplies electrical power from the emergency power supply unit 200 to the motor 142. In order to do so, the controller 144 brings, if necessary, the fuel cell to a working condition. If the fuel cell is not in a working condition (i.e. in particular at a working temperature) and/or has not been brought to a working condition yet, the motor 142 can be fed temporarily from a capacitor as shown in FIG. 4 below, or from some other energy storage or generating means. The capacitor may also provide the energy for the fuel cell to be brought to a working condition. The fuel cell may in turn charge the capacitor after being brought to a working condition.

Figure 3:
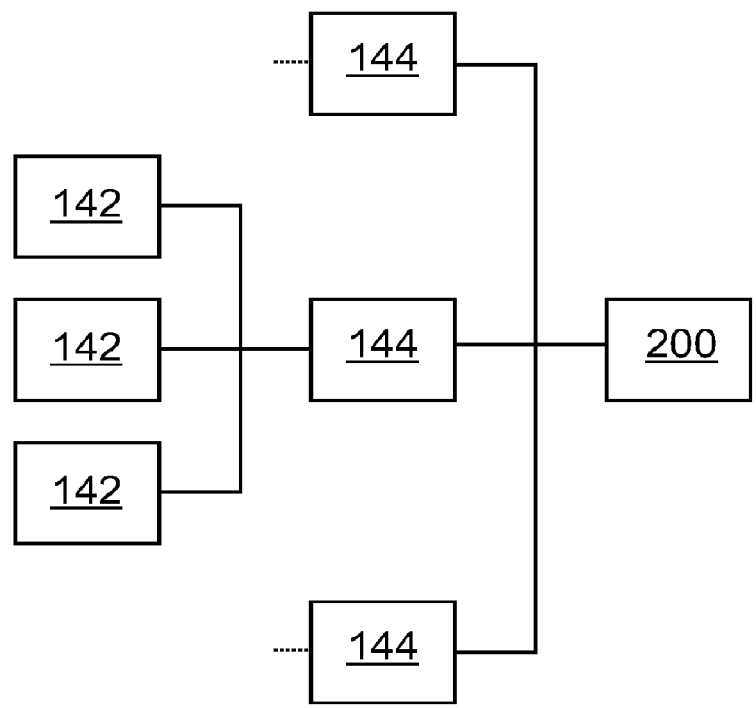
FIG. 3 is a schematic view of a further emergency pitch drive unit of wind turbines.

FIG. 3 shows a configuration which is similar to that of FIG. 2, but in which three motors 144 are shown, one per rotor blade of the wind turbine. The controller 144 is adapted for controlling all three motors 144 as described for FIG. 2, using, if necessary, the power from the emergency power supply 200. Although no connection to the power network is shown in FIG. 3, such a connection may be provided as shown in FIG. 2.

FIG. 3 also illustrates, as a further aspect, that the emergency power supply 200 may supply power to the emergency pitch drive systems of more than one wind turbine. This is shown schematically by additional controllers 144 that are connected to the emergency power supply 200, each of the controllers 144 belonging to a separate wind turbine e.g. of a wind park.

FIG. 4 is a schematic view of an emergency/secondary power supply unit 200, which comprises a fuel cell 210, a capacitor 220, and a switchbox 230. The capacitor 220 is optional and may be used for buffering electrical power. In a preferred embodiment, the capacitor is an electrochemical double layer capacitor or UltraCap. The capacitor 220 is dimensioned for buffering sufficient electrical power for driving the pitch drive motors to bring the corresponding rotor blade(s) to a shutdown configuration. This means, the power is sufficient to bring them to the shutdown configuration regardless of their starting configuration, e.g. regardless of the pitch angle they are presently at. The capacitor 220 may be replaced by another energy buffer. For example, an intermediate circuit of the inverter fed by the wind turbine generator can be used as an energy buffer that replaces the capacitor 220.

In a further embodiment, the capacitor 220 may be operatively connected to the fuel cell 210 (via wire 222) for delivering the energy needed for heating the fuel cell 210 to working temperature.

The switchbox 230 allows power to be provided either from the fuel cell 210 or from the capacitor 220. In particular, the switchbox 230 allows power to be supplied from the fuel cell 210 if the fuel cell is in a working condition, and from the capacitor 220 if this is not the case. This allows for a fast shutdown operation also e.g. in the case that the fuel cell has not been brought to a working temperature yet. The capacitor is charged or kept charged during normal operation of the wind turbine, either using power from the network or from the wind turbine. The capacitor may also be charged during network failure using the fuel cell. To this purpose, the capacitor is switchably connected to the turbine generator (preferably to an intermediate circuit of an inverter of the wind turbine) or to the power network, if necessary, via a power rectifier, or to the fuel cell.

The fuel cell 210 is not shown in detail, but may be provided as is described e.g. in the textbook "Fuel Cell Systems Explained" by J. Larminie and A. Dicks ($2^{nd}$ edition, 2003), or in the "Fuel Cell Handbook" from the US Department of Energy ($7^{th}$ edition, 2004, available from the National Technical Information Service, U.S. Department of Commerce, 5285 Port Royal Road, Springfield, Va. 22161), or in the textbook "Fuel Cells—From Fundamentals to Applications" by Supramaniam Srinivasan (Springer, 2006).

The fuel cell can be e.g. a hydrogen ($H_2$) or methane fuel cell. It may comprise a gas tank e.g. for compressed fuel such as hydrogen, which is dimensioned for supplying emergency power to the wind power installation. The fuel cell may be, e.g., a MCFC (molten carbonate fuel cell) or a SOFC (solid oxide fuel cell).

The fuel cell may be e.g. a PEMFC (proton exchange membrane fuel cell), a PAFC (phosphoric acid fuel cell) or a DMFC (direct methanol fuel cell). These fuel cells are operable at relatively low temperatures (less than 200° C., 150° or even less than 100° C.), and may therefore brought to a working condition relatively quickly. In an embodiment, the fuel cell is a PEMFC in the power range of 5-50 kW, with an operating temperature of 50-90° C.; and/or with a power density of about 0.7 $W/cm^2$.

A plurality of fuel cells (e.g. PEMFCs) may be combined in a stack. In this case, the stack may be dimensioned as follows:
Electrode area: 10-250 cm2
Rated Power: 0.01-250 kW
Conversion efficiency (chemical to electric energy): about 40%
Life span: 3000 operating h
Degradation Rate: 3-5 mV/1000 h.

The fuel cell(s) may be dimensioned to supply a current of 50-140 A per pitch drive motor at a voltage of 144 V, and/or to supply a power of 4-9 kW per pitch drive motor. If the fuel cell(s) should also drive a azimuthal drive, they may have up to twice the above dimensions.

Figure 5A:
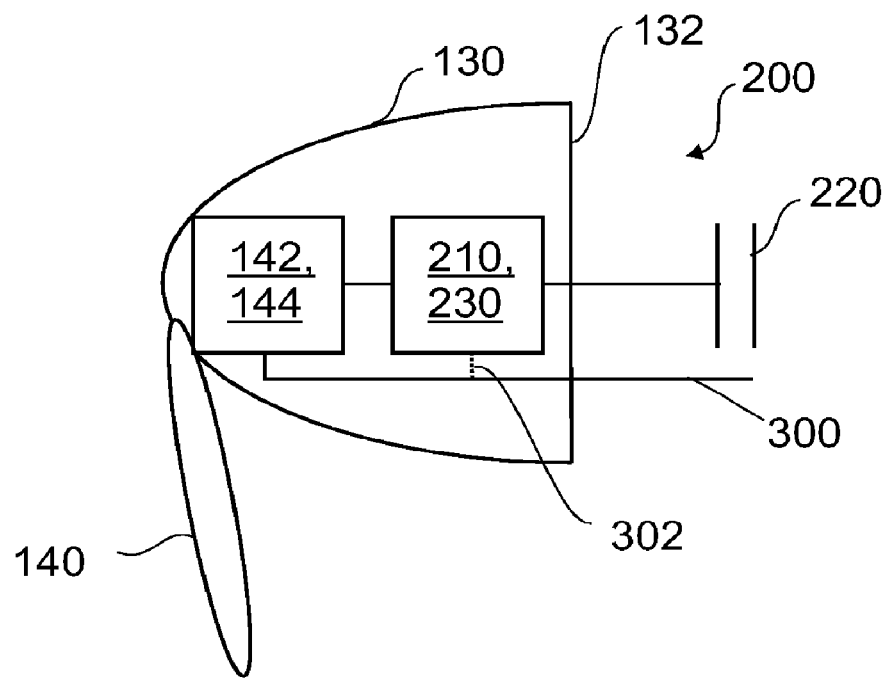
FIG. 5a is a schematic view of a turnable hub of a wind turbine with a fuel cell and a switchbox arranged therein.

As shown in FIG. 5a, the fuel cell 210 may be arranged in the turnable hub 130 of the wind turbine. This arrangement allows the fuel cell 210 to be connected to the pitch drives 142 by fixed wires, i.e. without a slip ring. Such a connection by fixed wires may improve fail-safe operation of the emergency pitch drive.

Figure 5B:
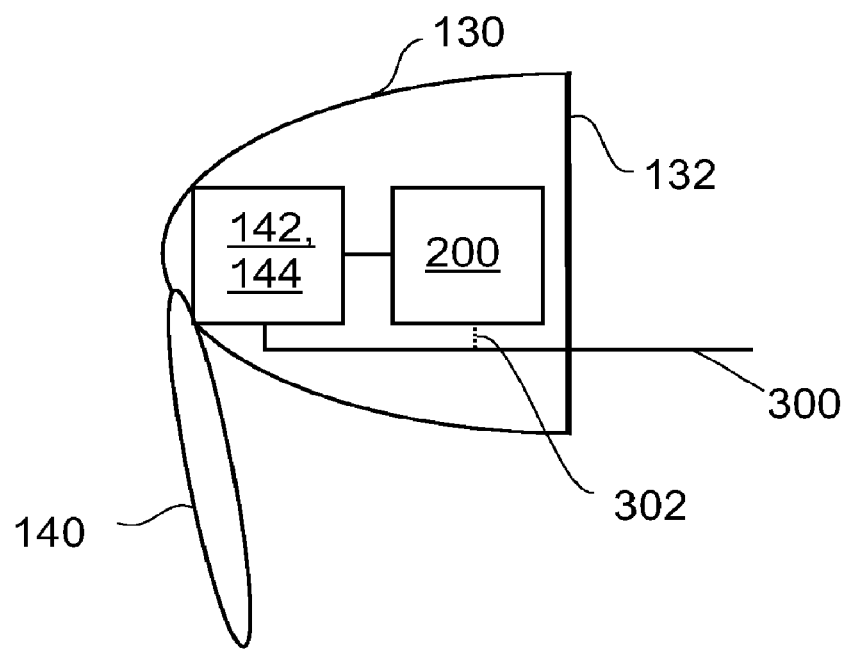
FIG. 5b is a schematic view of a turnable hub of a wind turbine with an emergency power supply arranged therein.

In the embodiment of FIG. 5a, the fuel cell 210 and the switchbox 230 are arranged in the hub, while the capacitor 220 is arranged in another part of the turbine. Thus, the capacitor 220 is connected via a slip ring 132 to the fuel cell 210 and/or the switchbox 230 (as shown in FIG. 4). Further, an external power supply is connected to the fuel cell 210 and/or to the switchbox 230 via wires 300, 302 and slip ring 132. FIG. 5b shows an alternative arrangement, in which the entire emergency power supply unit 200 (including the capacitor, if applicable) is arranged in the hub 130. In the arrangements of FIGS. 5a and 5b, an energy supply 300 is connected to the fuel cell via the slip ring 132 and wire 302.

Alternatively, the fuel cell can be provided in another part of the wind turbine, e.g. in the nacelle, the base, or can even be provided in a housing separate from the wind turbine.

In embodiments, the fuel cell is kept at working condition (temperature) continuously, in order to be ready in the case of an emergency. In this case, the fuel cell may also serve other purposes, e.g. as an energy buffer for compensating short and medium term fluctuations of the generated power.

A system for maintaining the fuel cell at working temperature (first heating system) may advantageously be combined with a system for cooling other parts of the wind turbine, in particular for cooling the generator and/or the gear. In particular, there can be a heat supply for supplying the waste heat of the cooling system to the fuel cell. In this case, there may optionally be provided a second heating system, which is independent of the first heating system and which may be powered by an external source, e.g. by the net or by a capacitor 220 (via supply 222, see FIG. 4).

In alternative embodiments, the fuel cell may be generally not at working condition during normal operation, and be brought to a working condition only in the case of an emergency. This reduces power consumption during normal operation.

Figure 6:
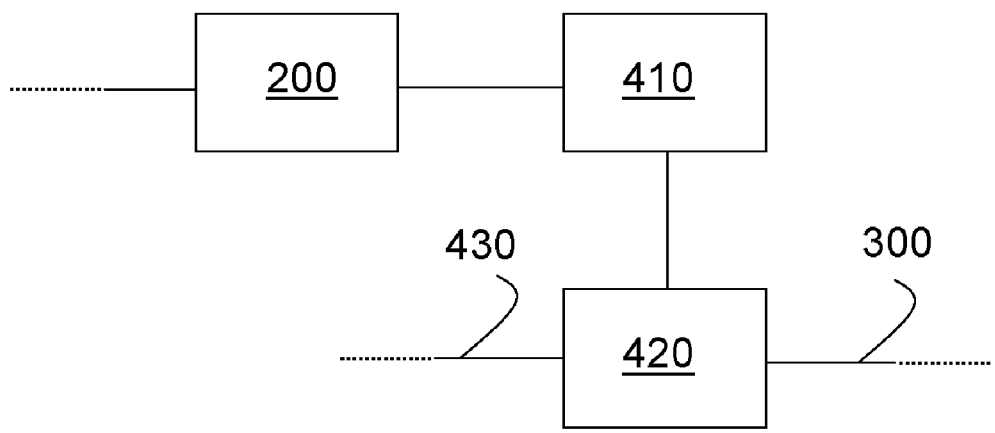
FIG. 6 is a schematic view of a charging unit comprising an electrolysis apparatus for charging a fuel cell.

The fuel cell may be charged during normal operation by a charging unit. As illustrated in FIG. 6, for charging the fuel cell (200), the charging unit generally comprises an electrolysis apparatus (410) for generating fuel to be supplied to a fuel tank of the fuel cell; and a power supply (420) for supplying power to the electrolysis apparatus, e.g. from the network (300) or from the wind turbine. The electrolysis apparatus (410) is then switchably connected to the power network (300) or to the turbine generator, if necessary via a power rectifier. In an embodiment, there is an electrolysis apparatus provided for charging for charging the fuel cell(s) associated to a plurality of wind turbines. The electrolysis apparatus may be fed by electrical energy from the wind turbines during normal operation (e.g. by DC power from the inverter's intermediate circuit (430)). In particular if $H_2$ is used as fuel, it may be stored in a high-pressure container, e.g. at 130-150 bar.

This written description uses examples to disclose the invention, including the best mode, and also to enable any person skilled in the art to make and use the invention. While the invention has been described in terms of various specific embodiments, those skilled in the art will recognize that the invention can be practiced with modification within the spirit and scope of the claims. Especially, mutually non-exclusive features of the embodiments described above may be combined with each other. The patentable scope of the invention is defined by the claims, and may include other examples that occur to those skilled in the art. Such other examples are intended to be within the scope of the claims of they have structural elements that do not differ from the literal language of the claims, or if they include equivalent structural elements with insubstantial differences from the literal languages of the claims.

What is claimed is:

1. Emergency pitch drive unit for a wind turbine comprising:
    an electrical motor arranged for adjusting the pitch angle of a wind turbine rotor blade;
    an emergency power supply unit for supplying electrical power to the motor, the emergency power supply unit comprising a fuel cell, wherein the emergency power supply unit further comprises an energy buffer such as a capacitor; and
    a controller configured for controlling, in the event of a power failure, the motor to adjust the pitch angle using the electrical power from the emergency power supply unit;
    wherein the controller is further configured, in the event of a power failure, to control the fuel cell to be heated to a temperature in a working temperature range, and supply electrical power from the energy buffer for adjusting the pitch angle while the fuel cell temperature is below the working temperature range.

2. Emergency pitch drive unit according to claim 1, wherein the energy buffer is dimensioned and operatively connected for supplying power to the motor to bring the pitch angle to a feathered position, and optionally further dimensioned and operatively connected for bringing the fuel cell to a working condition.

3. Emergency pitch drive unit according to claim 1, further comprising a heating system for heating the fuel cell to a working temperature, the heating system being adapted and controlled for heating the fuel cell continuously to operating temperature during normal operation of the wind turbine.

4. Emergency pitch drive unit according to claim 3, wherein the heating system is adapted for supplying waste heat of a cooling system for cooling parts of the wind turbine to the fuel cell.

5. Emergency pitch drive unit according to claim 1, further comprising a charging arrangement adapted for charging up the capacitor during normal operation of the wind turbine.

6. Emergency pitch drive unit according to claim 1, wherein the fuel cell is selected from the group consisting of MCFC, SOFC, PEMFC, and DMFC, and is preferably in the power range of 5-50 kW.

7. Emergency pitch drive unit according to claim 6, wherein the emergency power supply unit is operatively connected to supply power from an intermediate circuit of an inverter fed by a generator of the wind turbine.

8. Emergency pitch drive unit according to claim 1, wherein the fuel cell is adapted for a working temperature of less than 200° C., preferably in the range between 70° C. and 120° C.

9. Emergency pitch drive unit according to claim 1, wherein the emergency power supply unit comprises a fuel cell charging unit comprising:
   an electrolysis apparatus for generating fuel to be supplied to a fuel tank of the fuel cell; and
   a power supply for supplying power to the electrolysis apparatus.

10. Emergency pitch drive unit according to claim 1, wherein the emergency power supply unit is operatively connected to an azimuthal drive of a rotor of the turbine for supplying power to the azimuthal drive.

11. Emergency pitch drive unit according to claim 1, wherein the fuel cell is arranged in a turnables hub of the wind turbine.

12. Emergency pitch drive unit according to claim 1, wherein the emergency power supply unit further comprises an energy buffer, and
   wherein the energy buffer is dimensioned and operatively connected for supplying power to the motor to adjust the pitch angle, and further dimensioned and operatively connected for bringing the fuel cell to a working condition; and
   wherein the controller is further configured to supply electrical power from the energy buffer for adjusting the pitch angle while the fuel cell temperature is below a working temperature range, and to control the fuel cell to be heated to a temperature in a working temperature range in the event of a power failure.

13. Method for shutting down a wind turbine, comprising:
   detecting an event of a power failure,
   supplying electrical power from an emergency power supply unit comprising a fuel cell to an electrical motor; and
   adjusting the pitch angle of a wind turbine rotor blade using the electrical motor;
   wherein the method further comprises,
   in the event of a power failure, heating the fuel cell to a temperature inside a working temperature range of the fuel cell, and
   supplying electrical power from a capacitor to the motor while the fuel cell temperature is below the working temperature range.

14. Method according to claim 13, wherein a working temperature range of the fuel cell includes a temperature of less than 200° C.

15. Emergency pitch drive unit for a wind turbine comprising:
   an electrical motor arranged for adjusting the pitch angle of a wind turbine rotor blade;
   an emergency power supply unit for supplying electrical power to the motor, the emergency power supply unit comprising a fuel cell, and wherein the emergency power supply unit further comprises an energy buffer; and
   a controller configured for controlling, in the event of a power failure, the motor to adjust the pitch angle using the electrical power from the emergency power supply unit;
   wherein the energy buffer is dimensioned and operatively connected for supplying power to the motor to adjust the pitch angle, and further dimensioned and operatively connected for bringing the fuel cell to a working condition; and
   wherein the controller is further configured to supply electrical power from the energy buffer for adjusting the pitch angle while the fuel cell temperature is below a working temperature range, and to control the fuel cell to be heated to a temperature in a working temperature range in the event of a power failure.

\* \* \* \* \*